No. 675,667. Patented June 4, 1901.
F. C. NEWELL.
ELECTRIC BRAKE FOR RAILWAY CARS.
(Application filed Mar. 28, 1900.)
(No Model.) 2 Sheets—Sheet 1.
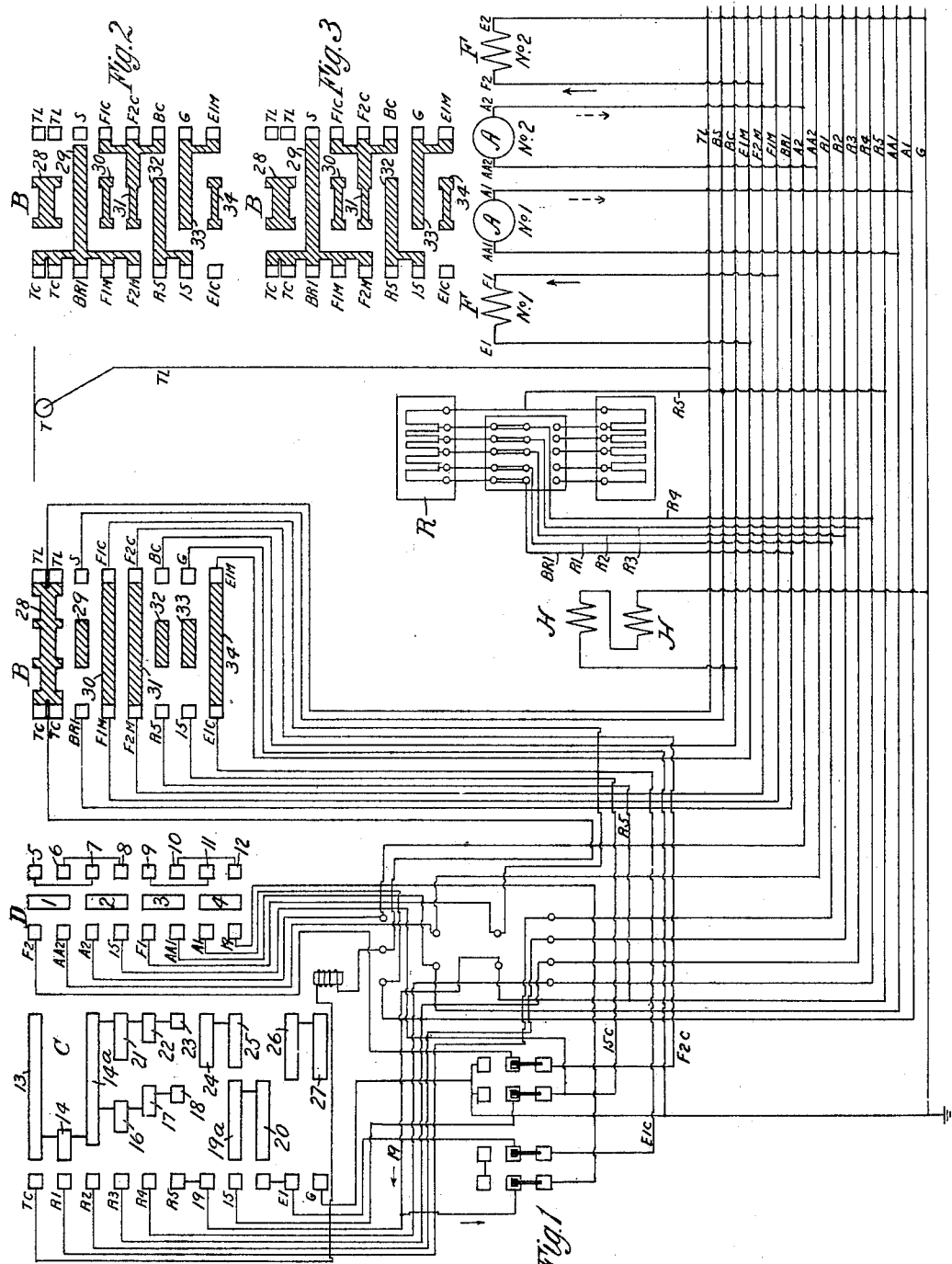

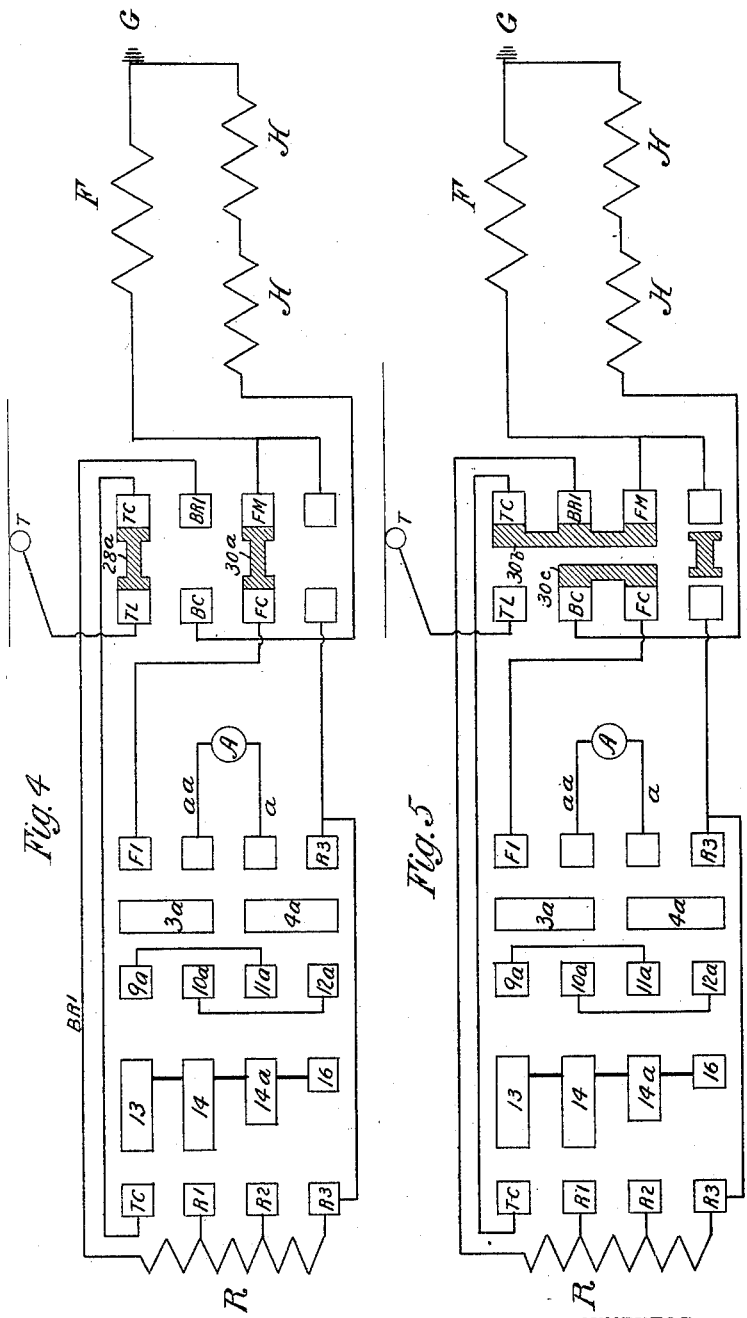

UNITED STATES PATENT OFFICE.

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA.

ELECTRIC BRAKE FOR RAILWAY-CARS.

SPECIFICATION forming part of Letters Patent No. 675,667, dated June 4, 1901.

Application filed March 28, 1900. Serial No. 10,490. (No model.)

*To all whom it may concern:*

Be it known that I, FRANK C. NEWELL, a citizen of the United States, residing at Wilkinsburg, county of Allegheny, State of Pennsylvania, have invented or discovered a certain new and useful Improvement in Electric Brakes for Railway-Cars, of which improvement the following is a specification.

The object of my invention is to provide an improvement in electric brakes for railway-cars; and to this end it consists in new and improved means whereby a general improvement is effected in electrical braking apparatus and whereby the brakes may be more easily and quickly operated and controlled than has heretofore been possible with any apparatus of which I am aware; and it further consists in certain combinations and features of construction whereby the installation and operation of the braking system are simplified and the time required for operation and the possibility of mistake by the operator are greatly reduced.

My invention is specially adapted for application on electrically-propelled cars, and provides means comprising a braking-switch and connections applicable to any ordinary electrical motor and controller equipment for railway-cars whereby the car motor or motors may be cut out from the trolley-line and connected up in a local braking-circuit to generate current for braking purposes and whereby the brakes may be applied instantaneously, all by a single comparatively short movement of the handle of a braking-switch, regardless of the position of the main or running controller or reversing-switch at the time that the braking-switch is operated to effect an application of the brakes and without requiring any manipulation or change of position of the running controller or reversing-switch before applying or in order to apply the brakes.

After the local braking-circuit is connected up by the operation of the braking-switch and the motor or motors connected for supplying current to the braking-circuit the current may be controlled by varying the resistance in the circuit by means of any suitable controlling device; but in my present application for patent I employ the main or running controller for this purpose, and this forms an important feature of my invention, by means of which the manipulation of the controller for braking purposes and also the necessary construction of the controller are greatly simplified, the movement of the handle of the running controller for the purpose of increasing or decreasing the resistance when braking being in the same direction and over exactly the same arc as it would be for increasing or decreasing the resistance when running and receiving current from the trolley-line, the same set of contact bars and fingers being employed for varying the resistance in running and in braking, so that the shifting of the controller-handle over a large arc from one side of the controller to the other beyond a neutral line is not required, as it is in constructions now in use where two sets of contacts are employed on opposite sides of the controller.

In the accompanying drawings, which illustrate my invention, Figure 1 is a diagram showing an application of my improvement to a car provided with two motors, the braking-switch being in the position which it will occupy when current is being supplied from the trolley-line for running the car; Fig. 2, a view showing the braking-switch in the position to which it will be thrown for applying the brakes; Fig. 3, a view showing the braking-switch in the position to which it may be moved when it is desired to shunt the resistance; Fig. 4, a diagram which illustrates in a simple form an application of my improvement to a car provided with but a single motor, the braking-switch being in position for running; Fig. 5, a similar diagram showing the braking-switch in position for braking.

In Fig. 1 of the drawings I have shown such an application of my invention as may be employed on an electrically-propelled car equipped with two motors which may be connected in series or in multiple for running the car and in multiple for braking purposes when operating as generators. It will be understood, however, that my invention is not limited in its application to any particular number of motors, as either a single motor or any greater number may be employed.

As shown in Fig. 1 of the drawings, the running controller C, reversing-switch D, and braking-switch B are located at one end of a car, and the other end of the car is provided with a similar controller, reversing-switch, and braking-switch, similarly connected in the wiring system. The reversing-switch D and the main controller C are shown in the open position, and the braking-switch B is shown in the running position which it will occupy when the car is being supplied with current from the trolley-line. If the reversing-switch D be moved so as to bring the bars 1, 2, 3, and 4 in contact with the terminals F² AA², &c., on the left, the reversing-switch will then be in position for running in one direction, and if the reversing-switch be moved so as to bring the other set of contact bars or points 5 to 12 in contact with the terminals F² AA², &c., the reversing-switch will then be in position for running in the reverse direction.

If the reversing-switch be placed in position for running ahead and the controller C be moved so as to bring the contact-bars 13 and 14 in contact with the terminals TC and R', current will flow from the main line through the trolley T and wire TL to the bar 28 on the braking-switch and thence through the wire TC, contact-bars 13 and 14 on the main controller through the lead R', resistance device R, leads R⁵ and 19, contact-bar 4 on the reversing-switch, lead A' to armature A of No. 1 motor, lead AA', contact-bar 3 on reversing-switch, leads F' and F' C, contact-bar 30 on braking-switch, lead F' M, through field F of No. 1 motor, lead E' M, contact-bar 34 on braking-switch, lead E' C to contact-bars 20 and 19ᵃ on main controller, lead 15, contact-bar 2 on the reversing-switch, lead A², armature A of No. 2 motor, lead AA², contact-bar 1 on reversing-switch, lead F² C, contact-bar 31 on braking-switch, lead F² M, field F of No. 2 motor, and to ground. The main controller may be operated to vary the resistance by means of the contact-bars 14ᵃ, 16, 17, and 18 making contact with the terminals R², R³, R⁴, and R⁵ when the motors are in series, the contact-bars 21, 22, 23, 24, 25, 26, and 27 being employed to make contact with the corresponding terminal points when the motors are being operated in multiple.

When it is desired to apply the brakes, the braking-switch is by a single movement (preferably through an arc of ninety degrees) shifted to the position shown in Fig. 2. When the braking-switch is in this position, the current from the trolley-line is cut off, the motors and the electromagnetic braking devices are connected up in a local braking-circuit, and the motors then operate as generators to supply current to the local braking-circuit. If the main controller be then in the position shown in Fig. 1, current from the armature A of No. 1 motor flows in the direction indicated by the dotted arrow through lead A', contact-bar 4 on the reversing-switch, leads 19 and R⁵, through the resistance device R, through lead BR', and the contact bar 29 of the braking-switch to F' M and F² M through the fields of both motors, from the field of No. 1 motor through lead E' M and contact-bar 33 of the braking-switch and lead G to the coils H of the magnetic brake device, and from the field of No. 2 motor through the lead G to the coils H of the braking device, from the braking device through the lead BC, arm 31 on the braking-switch, leads F' C and F² C through the contact-bars 3 and 1, respectively, of the reversing-switch, and through leads AA' and AA² to the armatures of the motors. From the armature of No. 2 motor the current flows in the direction indicated by the dotted arrow through lead A², through contact-bar 2 on the reversing-switch, lead 15, contact-bar 32 on the braking-switch, to lead R⁵, where it joins with the current from the armature of No. 1 motor in the branch leading to the resistance device R.

It will be seen that when the braking-switch is thrown to the position shown in Fig. 2 the current from the trolley-line will be cut off and the brakes applied no matter what may be the position of the main controller. If the main controller be in the open position, as in Fig. 1, the brakes will be applied with the maximum resistance in the braking-circuit—that is, the braking-current will then flow from the lead R⁵ through all of the resistance devices and out through the lead BR' without having any portion of it shunted. If the main controller happens to be in position to make contact between the contact-bar 14 and the terminal of lead R', a portion of the resistance will be shunted, and when the contact-bars 14ᵃ, 16, 17, or 18 make contact with the terminals of the leads R², R³, R⁴, and R⁵ the resistance in the local circuit will be correspondingly varied—that is, the resistance in the local braking-circuit will be determined by the position of the main controller, as in running, so long as the contact-bar 13 is in contact with terminal TC, and any variation of the resistance in the braking-circuit will be effected by the same movement of the main controller as would be necessary to similarly vary the resistance while running.

The brake-switch is wholly independent of the reversing-switch and may be thrown at any time without moving or interfering in any way with the reversing-switch. The connections of the brake-switch are such as to direct the current through the field-coils of the motors always in the same direction whether the brake-switch is set for running or braking. In this way the residual magnetism is not lost at the time the brake-switch is thrown, but will be built up and increased, producing a stronger field and more current. The reversing-switch is so connected as to reverse the direction of the current through the armatures of the motors, but does not affect the direction of the current through the fields of the motors.

In Fig. 3 of the drawings I have shown the braking-switch in a third position, to which it may be moved in cases of emergency, so as to shunt the current around the resistance devices and apply the brakes with maximum force by the movement of the braking-switch only. This third position of the braking-switch, which is the second position of that switch for braking, puts the bar 29 in contact with the terminal S of the lead BS, whereby the current from the armatures may pass from the lead $R^5$ to the leads F'M and $F^2$M without passing through the resistance devices. This shunt position of the braking-switch is just a little beyond the first braking position, so that the handle of the braking-switch may be easily and quickly thrown to the emergency position by a single movement of a little more than ninety degrees.

It will be seen that by means of my improvement the brakes may be quickly applied with any desired degree of force, depending upon the position of the main controller, or with maximum force by a single movement of the braking-switch. If the main controller be placed on the "first point"—that is, with the contact-bars 13 and 14 engaging the terminals TC and R'—the car may be operated for running and braking by the movement of the braking-switch only. This is an important feature in approaching intersections with other tracks or in following closely behind other moving vehicles and is possible because no movements of the controlling devices are necessary, such as might cause a loss or reversal of the field magnetism of the motors. When very near to a point where it is desired to stop, the braking-switch may be thrown to the position shown in Fig. 3, when the brakes will be applied, and the main controller being in position to make contact between the contact-bars 13 and 14 and the terminals TC and R' the car may be started by moving the braking-switch to the position shown in Fig. 1 and again stopped by returning the braking-switch to the position shown in Fig. 3, and these movements may be made as quickly and as often as may be necessary.

The connections of the braking-switch with the reversing-switch, with the main controller, and with the field-leads are such that the braking-switch may be applied to any of the ordinary electric-car equipments without any change in the controller or reversing-switch or their connections, all of the connections with the braking-switch being made with the field-leads outside of the casing of the main controller and reversing-switch.

In Figs. 4 and 5 of the drawings I have shown by means of simple diagrams the location and connections of the braking-switch when in the running position and when in the braking position. In Fig. 4, which shows the connections for running, the current from the trolley-line passes from terminal TC to contact-bars 13 and 14 and through the resistance device, through $R^3$, contact-bar $4^a$, lead $a$, armature A of the motor, lead $a\,a$, contact-car $3^a$, terminal F' of the field-lead, bar $30^a$, through the terminal FM, and through the field F of the motor to the ground.

When the braking-switch is moved to the position shown in Fig. 5, the current will pass from the armature A of the motor through the lead $a$ to the contact-bar $4^a$, through $R^3$, and wholly or partly through the resistance device R on the controller to the terminals TC and BR' on the braking-switch through contact-bar $30^b$, through the field of the motor, through the brake-coils HH, terminal BC, contact-bar $30^c$, terminals FC and F', bar $3^a$ on the reversing-switch, and through $a\,a$ to the armature of the motor.

It will be clearly seen from Figs. 4 and 5 that when the braking-switch is moved from the running position to the braking position the current from the main line is cut off and the field-lead from the reversing-switch to the field of the motor is interrupted, one portion being connected with the brake device and the other portion with one terminal of the resistance device R and with the supply-lead to the controller, so that all the current from the armature of the motor will pass through all of the resistance if the controller be in the open position, or the current may be shunted around a part of the resistance if the controller be in some other position.

I claim as my invention and desire to secure by Letters Patent—

1. The combination, on an electrically-operated car, of a motor, or motors, a running controller for the motor, or motors, and a brake-switch adapted to connect the motor, or motors, to act as generators in a local braking-circuit so as to apply the brakes whatever the position of the controller may be.

2. The combination, on an electrically-operated car, of a motor, or motors, a reversing-switch, a brake-switch independent of the reversing-switch and adapted to connect the motor, or motors, to act as generators in a local braking-circuit, and a running controller for the motor, or motors, which is adapted to control the current in the braking-circuit by the same movements of the controller as in running.

3. The combination, on an electrically-operated car, of a motor, or motors, a running controller, a reversing-switch and a brake-switch adapted by a single movement to connect the motor, or motors, to act as generators in a local braking-circuit so as to apply the brakes whatever the position of the controller and regardless of the direction for which the reversing-switch may be set.

4. The combination, on an electrically-operated car, of a motor, a running controller and a reversing-switch for controlling and reversing the motor, and a braking-switch independent of the reversing-switch and adapted to cut out the running controller from the main line, and to connect the motor and controller in a local braking-circuit.

5. The combination, on an electrically-operated car, of a motor, a controller, a reversing-switch, a brake device, and a braking-switch adapted to disconnect the controller from the main supply or trolley line and to connect the field-lead of the motor with the supply-lead to the controller and by the same movement to connect the brake device with the field-lead from the reversing-switch, whereby the motor, the controller, and the brake device are connected in a local brake-circuit to which current regulable by the controller may be supplied by the motor acting as a generator.

6. The combination, on an electrically-operated car, of a motor, a brake-switch adapted to connect the motor to act as a generator in a local braking-circuit when the controller is in any position, and a running controller adapted to control the current in the braking-circuit by the same movements as in running.

7. The combination, on an electrically-operated car, of a motor, a running controller, a reversing-switch and a brake-switch adapted to connect the motor to act as a generator in a local braking-circuit so as to apply the brakes when the running controller is in the open position and the reversing-switch is in the position corresponding to the direction in which the car is moving.

8. The combination, on an electrically-operated car, of a motor, a brake-switch adapted to connect the motor to act as a generator in a local braking-circuit when the controller is in the open position, and a running controller adapted to control the current in the braking-circuit by the same movements as in running.

9. The combination, on an electrically-operated car, of a motor, a running controller, a reversing-switch for reversing the current through the armature, and a brake-switch adapted to connect the motor to act as a generator in a local braking-circuit when the controller is in any position.

10. The combination, on an electrically-operated car, of a motor, a running controller, and a braking-switch adapted, in one position, to cut out the running controller from the main line and to connect the motor and controller in a local braking-circuit, and, in another position, to cut out the controller from the local braking-circuit.

11. The combination, on an electrically-operated car, of a motor, a running controller and a braking-switch adapted to connect the motor to act as a generator in a local braking-circuit and to cut out the running controller from the local braking-circuit.

12. The combination, on an electrically-operated car, of a motor, a running controller, a reversing-switch, and a brake-switch adapted to connect the motor to act as a generator in a local braking-circuit when the controller is in any position without moving the reversing-switch.

In testimony whereof I have hereunto set my hand.

FRANK C. NEWELL.

Witnesses:
 JAS. B. MacDONALD,
 R. F. EMERY.